(12) United States Patent
Yang et al.

(10) Patent No.: US 11,474,021 B2
(45) Date of Patent: Oct. 18, 2022

(54) SYSTEM FOR MEASURING PROPERTIES OF MASS TRANSPORT BEHAVIOR IN MEMBRANE AND SOLUTIONS

(71) Applicant: Korea University Research and Business Foundation, Seoul (KR)

(72) Inventors: Dae Ryook Yang, Seoul (KR); Yoon Hyuk Jang, Seoul (KR); Kiho Park, Seoul (KR); Ji Woong Chang, Busan (KR)

(73) Assignee: Korea University Research and Business Foundation, Seoul (KR)

( * ) Notice: Subject to any disclaimer, the term of this patent is extended or adjusted under 35 U.S.C. 154(b) by 124 days.

(21) Appl. No.: 16/983,139

(22) Filed: Aug. 3, 2020

(65) Prior Publication Data
US 2021/0055199 A1 Feb. 25, 2021

(30) Foreign Application Priority Data

Aug. 22, 2019 (KR) .................. 10-2019-0102904
Sep. 30, 2019 (KR) .................. 10-2019-0120563
Jul. 28, 2020 (KR) .................. 10-2020-0093807

(51) Int. Cl.
    *G01N 15/08* (2006.01)
    *G01N 30/36* (2006.01)
    *G01N 30/02* (2006.01)

(52) U.S. Cl.
    CPC ......... *G01N 15/0826* (2013.01); *G01N 30/36* (2013.01); *G01N 2015/086* (2013.01); *G01N 2030/027* (2013.01)

(58) Field of Classification Search
    CPC ............... G01N 15/0826; G01N 30/36; G01N 2015/086; G01N 2030/027
    See application file for complete search history.

(56) References Cited

U.S. PATENT DOCUMENTS 8,029,857 B2 * 10/2011 Hoek ................ B01D 71/56
                                              210/500.25
9,248,405 B2 *  2/2016 McGinnis ........... B01D 61/364
(Continued)

FOREIGN PATENT DOCUMENTS

CN     102272449 B  *  4/2015  .......... B01D 61/002
JP       6486799 B2     3/2019
(Continued)

OTHER PUBLICATIONS

Bai et al., "Effect of Membrane Orientation and Concentration of Draw Solution on the Behavior of Commercial Osmotic Membrane in a Novel Dynamic Forward Osmosis Tests," Membranes 2022, 12, 385 (Year: 2022).*

*Primary Examiner* — John Fitzgerald
(74) *Attorney, Agent, or Firm* — NSIP Law

(57) ABSTRACT

Disclosed is a system for measuring mass transfer in a membrane and solutions. The system includes: a membrane module 10 including a feed solution reservoir 11 accommodating a feed solution f, a draw solution reservoir 13 accommodating a draw solution d whose osmotic concentration is higher than that of the feed solution f, and a holder 15 supporting a semipermeable membrane m arranged between the feed solution reservoir 11 and the draw solution reservoir 13 and whose performance is to be measured; a feed solution storage tank 20 storing the feed solution f; and a feed solution supply pump 30 supplying the feed solution f from the feed solution storage tank 20 to the feed solution reservoir 11 at a fixed flow rate corresponding to a water flux WF across the membrane m such that the water flux WF is maintained constant.

10 Claims, 12 Drawing Sheets

(56) References Cited

U.S. PATENT DOCUMENTS

| | | | | |
|---|---|---|---|---|
| 9,687,788 | B2* | 6/2017 | Duan | B01D 61/002 |
| 10,166,513 | B2* | 1/2019 | Li | B01D 69/06 |
| 10,214,438 | B2* | 2/2019 | Blohm | B01D 61/002 |
| 10,315,936 | B2* | 6/2019 | McGinnis | B01D 61/002 |
| 10,618,013 | B2* | 4/2020 | Hoek | B01D 67/0079 |
| 2008/0237126 | A1* | 10/2008 | Hoek | B01D 71/56 |
| | | | | 977/773 |
| 2010/0155333 | A1* | 6/2010 | Husain | C07C 29/76 |
| | | | | 210/295 |
| 2010/0224555 | A1* | 9/2010 | Hoek | B01D 69/125 |
| | | | | 427/322 |
| 2011/0027599 | A1* | 2/2011 | Hoek | C02F 1/4618 |
| | | | | 977/773 |
| 2017/0028349 | A1* | 2/2017 | Blandin | C02F 1/442 |
| 2018/0229184 | A1* | 8/2018 | Resendes | B01D 1/14 |
| 2018/0297867 | A1* | 10/2018 | Fleckner | C02F 1/008 |
| 2020/0246757 | A1* | 8/2020 | Hoek | B01D 67/0079 |

FOREIGN PATENT DOCUMENTS

| | | |
|---|---|---|
| KR | 10-2011-0045941 A | 5/2011 |
| KR | 10-2011-0089710 A | 8/2011 |
| KR | 10-1383014 B1 | 4/2014 |
| KR | 10-1609795 B1 | 4/2016 |
| KR | 10-1897864 B1 | 10/2018 |

\* cited by examiner

SYSTEM FOR MEASURING PROPERTIES OF MASS TRANSPORT BEHAVIOR IN MEMBRANE AND SOLUTIONS

CROSS-REFERENCE TO RELATED APPLICATIONS

This application claims the benefit under 35 USC § 119(a) of Korean Patent Application Nos. 10-2019-0102904 filed on Aug. 22, 2019, 10-2019-0120563 filed on Sep. 30, 2019, and 10-2020-0093807 filed on Jul. 28, 2020, in the Korean Intellectual Property Office, the entire disclosure of which is incorporated herein by reference for all purposes.

BACKGROUND OF THE INVENTION

1. Field of the Invention

The present invention relates to a system for measuring properties of mass transport behavior in a membrane and solutions, and more specifically to a technology for measuring parameters and properties of mass transfer related variables of a forward osmosis membrane.

2. Description of the Related Art

Forward osmosis water treatment is based on spontaneous osmosis in which when a semipermeable membrane is placed between two solutions of different concentrations, water moves across the membrane due to the concentration difference. Forward osmosis is applicable to not only water treatment processes such as seawater desalination, wastewater treatment, and dewatering, but also fertilizer and food production processes.

Generally, a membrane for a forward osmosis process has an asymmetric structure in which a thin selective layer is deposited on a thick porous support layer. In a practical forward osmosis process using this asymmetric membrane, the permeation of water across the membrane causes concentration polarization (CP) on the surface of the membrane and in the porous support layer. The concentration polarization on the surface of the membrane is referred to as "external concentration polarization (ECP)" and that in the porous support layer is referred to as "internal concentration polarization (ICP)". The concentration polarization creates a lower osmotic gradient than the osmotic gradient induced by the difference in concentration between the two solutions, resulting in a substantial loss of osmotic pressure. Accordingly, accurate measurement of the concentration polarization and the concentrations on and in the membrane is a prerequisite for the reduction of the concentration polarization phenomenon. However, it is substantially impossible to measure the concentrations on the surface of the selective layer and in the support layer, making it very difficult to accurately measure the concentration polarization. Under such circumstances, methods using theoretical models rather than directly measuring concentration polarization have been employed to estimate the degree of concentration polarization. However, the use of theoretical models depends on their accuracy, involves complex calculations, and is not well suited to some specific areas.

Thus, there is an urgent need for a solution to the problems of conventional methods for estimating concentration polarization.

SUMMARY OF THE INVENTION

The present invention has been made in an effort to solve the problems of the prior art and one aspect of the present invention is to provide a system for measuring properties of mass transport behavior in a membrane and solutions that can continuously measure the degree of concentration polarization in a broad concentration range, the structural parameters of the forward osmosis membrane, the mass transfer coefficient on the surface, the diffusion coefficient of a draw solution, and the reverse salt flux of the forward osmosis membrane through a single experiment.

A system for measuring mass transfer in a membrane and solutions according to an embodiment of the present invention includes: a membrane module including a feed solution reservoir accommodating a feed solution, a draw solution reservoir accommodating a draw solution whose osmotic concentration is higher than that of the feed solution, and a holder supporting a semipermeable membrane arranged between the feed solution reservoir and the draw solution reservoir and whose performance is to be measured; a feed solution storage tank storing the feed solution; and a feed solution supply pump supplying the feed solution from the feed solution storage tank to the feed solution reservoir at a fixed flow rate corresponding to a water flux across the membrane such that the water flux is maintained constant.

The system may further include a supply pump pressure gauge measuring the pressure of the feed solution supply pump for supplying the feed solution.

The feed solution supply pump may be a high-performance liquid chromatography (HPLC) pump.

The temperatures of the feed solution and the draw solution may be maintained in the range of 10 to 40° C.

The system may further include a draw solution storage tank storing the draw solution and a draw solution circulating pump circulating the draw solution such that the draw solution is circulated from the draw solution storage tank through the draw solution reservoir.

The flow rate of the circulating draw solution may be at least four times the water flux.

The system may further include a flow gauge measuring the flow rate of the circulating draw solution and a draw solution pressure gauge measuring the pressure of the circulating draw solution.

The feed solution reservoir may further include a feed line through which the feed solution is fed, a discharge line through which the feed solution is discharged, and a valve opening and closing the discharge line.

The system may further include a concentrated draw solution dosing pump dosing a concentrated draw solution, whose concentration is higher than that of the circulating draw solution, into the draw solution storage tank such that the draw solution, whose concentration is reduced by the water flux, is maintained in a predetermined concentration range.

The system may further include a sampling port in communication with the interior of the feed solution reservoir such that the feed solution is sampled.

The features and advantages of the present invention will become apparent from the following description with reference to the accompanying drawings.

Prior to the detailed description of the invention, it should be understood that the terms and words used in the specification and the claims are not to be construed as having common and dictionary meanings but are construed as having meanings and concepts corresponding to the technical spirit of the present invention in view of the principle that the inventor can define properly the concept of the terms and words in order to describe his/her invention with the best method.

According to the present invention, various variables related to mass transfer in the membrane (for example, degrees of external and internal concentration polarization, structural parameters of the forward osmosis membrane, mass transfer coefficient, mass diffusion coefficient, and reverse salt flux) can be measured continuously in a wide range of concentration with high accuracy, and complexity between the water flux and the surface concentration is simplified by fixing the water flux, resulting in a reduction in the uncertainty of measurement.

In addition, the single system can comprehensively measure and analyze various variables related to mass transfer to save time and cost required for measurement.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

Figure 1:
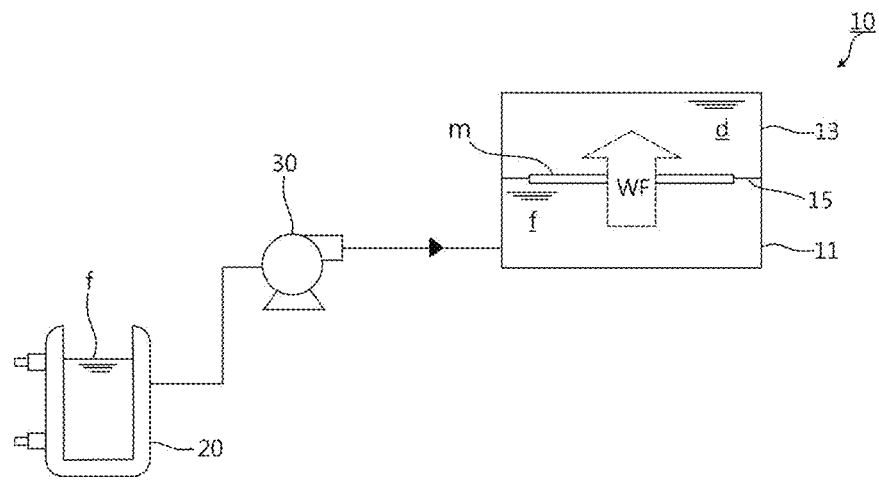
FIG. 1 is a diagram showing the constitution of a system for measuring mass transfer in a membrane and solutions according to one embodiment of the present invention.

Other objects, advantages, and novel features of the invention will become more apparent from the following detailed description and preferred embodiments with reference to the appended drawings. In the drawings, the same elements are denoted by the same reference numerals even though they are depicted in different drawings. In the description of the present invention, detailed explanations of related art are omitted when it is deemed that they may unnecessarily obscure the essence of the present invention.

Preferred embodiments of the present invention will now be described in detail with reference to the accompanying drawings.

FIG. 1 is a diagram showing the constitution of a system for measuring properties of mass transport behavior in a membrane and solutions according to one embodiment of the present invention.

As shown in FIG. 1, the system includes a membrane module 10 including a feed solution reservoir 11 accommodating a feed solution f, a draw solution reservoir 13 accommodating a draw solution d whose osmotic concentration is higher than that of the feed solution f, and a holder 15 supporting a semipermeable membrane m arranged between the feed solution reservoir 11 and the draw solution reservoir 13 and whose performance is to be measured; a feed solution storage tank 20 storing the feed solution f; and a feed solution supply pump 30 supplying the feed solution f from the feed solution storage tank 20 to the feed solution reservoir 11 at a fixed flow rate corresponding to a water flux WF across the membrane m such that the water flux WF is maintained constant.

The system of the present invention is an experimental setup for measuring the performance of a forward osmosis membrane. A forward osmosis membrane is a semipermeable membrane through which water permeates but few or no solutes (ions and molecules) permeate. When the forward osmosis membrane is placed between a high-concentration solution and a low-concentration solution, osmosis occurs in which a solvent moves from the low-concentration solution to the high-concentration solution until concentration equilibrium is reached. The forward osmosis membrane has an asymmetric structure in which a thin selective layer (active layer) is deposited on a thick porous support layer.

Spontaneous osmosis through such a semipermeable membrane is applied to forward osmosis water treatment. In a practical process, the permeation of water across the membrane causes concentration polarization (CP) on the surface of the membrane and in the porous support layer. The concentration polarization on the surface of the membrane is referred to as "external concentration polarization (ECP)" and that in the porous support layer is referred to as "internal concentration polarization (ICP)".

The concentration polarization causes a smaller difference in osmotic pressure than the theoretical osmotic gradient induced by the difference in concentration between two solutions. Thus, accurate measurement of the concentration polarization and the concentrations on and in the membrane is necessary for the evaluation of the membrane performance. However, since it is substantially impossible to measure the concentrations on the surface of the selective layer and in the support layer, there is a limitation in accurately measuring the concentration polarization.

Under such circumstances, theoretical models have been used rather than direct measurement of concentration polarization to estimate the degree of concentration polarization. However, the use of theoretical models depends on their accuracy, involves complex calculations, and is not well suited to some specific areas. The cause of this complexity is that water flux and surface concentration are intricately associated with each other. To eliminate this intricacy, complexity between water flux and surface concentration needs to be simplified. According to the conventional approaches, since only the concentrations of a low-concentration solution and a high-concentration solution are altered, water flux and surface concentration vary simultaneously, thus making it difficult to determine the exact behavior of the membrane and making the estimation dependent on the accuracy of the models.

If only the concentrations of the low-concentration solution and the high-concentration solution can be altered while maintaining the water flux constant, uncertainty of the surface concentration caused by a change in water flux is eliminated. This approach can be utilized to more accurately estimate the behavior of the membrane. The system of the present invention is versatile enough to measure the internal behavior of the membrane, the mass transfer coefficient, the structural parameters of the membrane, the reverse salt flux of the membrane, and the diffusion coefficient of the high-concentration draw solution by varying the concentration of the draw solution while maintaining the water flux constant. That is, the system of the present invention can indirectly measure concentration polarization along with various parameters related to concentration polarization. According to the prior art, mass diffusion coefficients are usually measured at a single concentration. Thus, measurement of mass diffusion coefficients over a broad concentration range depends on the interpolation of values measured at several concentrations. In contrast, the system of the present invention can continuously measure mass diffusion coefficients within a broad concentration range, ensuring more accurate and efficient measurement.

Specifically, the system includes a membrane module 10, a feed solution storage tank 20, and a feed solution supply pump 30.

Here, the membrane module 10 includes a feed solution reservoir 11, a draw solution reservoir 13, and a holder 15. The feed solution reservoir 11 and the draw solution reservoir 13 accommodate a feed solution f and a draw solution d, respectively. The feed solution reservoir 11 is in communication with the draw solution reservoir 13 through a passage in which a semipermeable membrane m is arranged as a target for performance measurement. The holder 15 supports the membrane m. The draw solution d has a higher osmotic concentration than the feed solution f. The feed solution f may be, for example, pure water or deionized water. In this case, uncertainty caused by continuous concentration is eliminated. In addition, since the flow of the solution is not significant in the feed solution reservoir 11, external concentration polarization can be eliminated. The feed solution f may be a solution of a draw solute (salt) in water. Due to the difference in concentration between the relatively low concentration draw solution d and the relatively high concentration feed solution f, water moves from the feed solution f to the draw solution d through the membrane m, that is, osmosis occurs. Here, the feed solution f can be supplied from the feed solution storage tank 20.

The feed solution storage tank 20 is in the form of a bath that stores the feed solution f. The temperature of the feed solution storage tank 20 can be controlled such that the temperature of the feed solution f is maintained constant. For example, a jacket and a thermostatic bath are connected to the feed solution storage tank 20 and a temperature controller is used to control the temperature of the feed solution storage tank 20. The feed solution f stored in the feed solution storage tank 20 is supplied to the feed solution reservoir 11 by the feed solution supply pump 30.

The feed solution supply pump 30 is connected to the feed solution storage tank 20 and the feed solution reservoir 11 through lines. The flow rate of the feed solution can be set by the feed solution supply pump 30. The set flow rate can be accomplished by increasing the pressure of the feed solution supply pump 30. Accordingly, when the feed solution supply pump 30 is operated at a predetermined pressure, the feed solution f (i.e. water) is supplied at a constant flow rate from the feed solution storage tank 20 to the feed solution reservoir 11. The water entering the draw solution reservoir 13 moves to the draw solution reservoir 13 through the membrane m because the feed solution reservoir 11 is closed. As a consequence, the water flows across the membrane m, that is, the water flux WF occurs. The water flux WF is attained through two driving energies, i.e. a pressure energy applied by the feed solution supply pump 30 and an osmotic gradient between the draw solution d and the feed solution f. Since the feed solution reservoir 11 is closed to prevent discharge of the feed solution f to the outside, the flow rate set by the feed solution supply pump 30 is equal to the water flux WF in the membrane m. The feed solution supply pump 30 may be a high-performance liquid chromatography (HPLC) pump or similar device that fixes the water flux WF to a constant level by hydraulic control.

Figure 2:
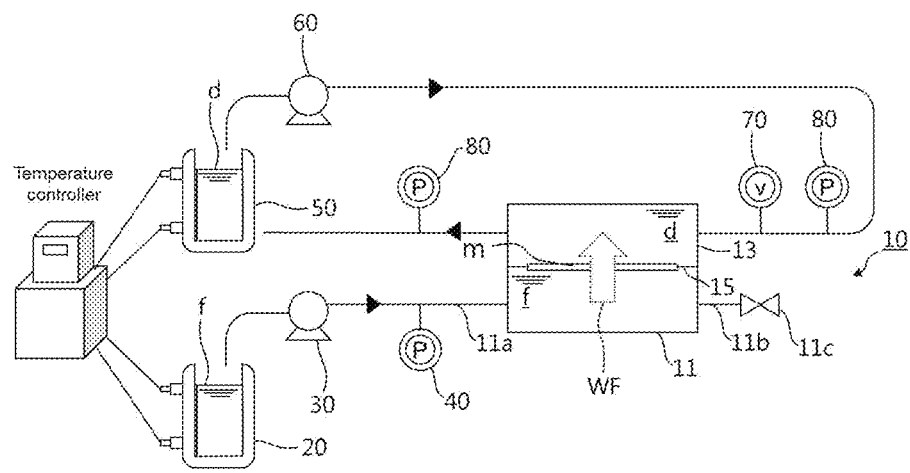
FIG. 2 is a diagram showing the constitution of a system for measuring mass transfer in a membrane and solutions according to a further embodiment of the present invention.

FIG. 2 is a diagram showing the constitution of a system for measuring mass transfer in a membrane and solutions according to a further embodiment of the present invention.

The system shown in FIG. 2 may further include a draw solution storage tank 50 and a draw solution circulating pump 60, in addition to the elements of the system shown in FIG. 1.

The draw solution storage tank 50 is in the form of a bath that stores the draw solution d. Like in the feed solution storage tank 20, a jacket and a thermostatic bath are connected to the draw solution storage tank 50 and a temperature controller is used to control the temperature of the draw solution storage tank 50. In this case, the temperatures of the feed solution storage tank 20 and the draw solution storage tank 50 are controlled such that the temperatures of the feed solution f and the draw solution d are maintained in the range of 10 to 40° C. Preferably, the temperature of the feed solution f is controlled so as to be the same as that of the draw solution d within the range defined above. This is to prevent the characteristics of the membrane m interposed between the feed solution f and the draw solution d from being changed by different temperatures.

The draw solution d stored in the draw solution storage tank 50 is circulated through the draw solution reservoir 13. That is, the draw solution d is fed from the draw solution storage tank 50 into the draw solution reservoir 13 and moves back to the draw solution storage tank 50. Lines are formed as passages through which the draw solution d flows.

The draw solution circulating pump 60 is a pump that circulates the draw solution d as above. The flow rate of the circulating draw solution d can be set to be sufficiently high through the flow rate control by the operation of the draw solution circulating pump 60 so that that external concentration polarization can be reduced as much as possible. The flow rate of the circulating draw solution d is preferably set to be at least four times the water flux WF. However, the flow rate of the circulating draw solution d containing a solute well dissolved in a solvent is not necessarily limited to at least four times the water flux WF as long as the concentration of the solute in the draw solution d is maintained constant.

A flow gauge 70 measuring the flow rate of the circulating draw solution d and a draw solution pressure gauge 80 measuring the pressure of the circulating draw solution d may be placed in a line through which the draw solution d is circulated. The draw solution pressure gauge 80 may be provided in plurality to measure the pressure of the draw solution before the draw solution is fed into the membrane module and after the draw solution passes through the membrane module. The measured pressure and flow rate of the draw solution d can be used for calculations required to measure variables for evaluating the performance of the membrane m.

A supply pump pressure gauge 40 may be placed in a line through which the feed solution supply pump 30 is connected to the feed solution reservoir 11. The supply pump pressure gauge 40 measures the pressure of the feed solution supply pump 30.

As described above, when the water flux WF occurs, water moves to the draw solution reservoir 13 through the membrane m so that the concentration of the draw solution d decreases continuously, resulting in a continuous decrease in osmotic gradient. However, a continuous increase in the pressure of the feed solution discharged from the feed solution supply pump 30 is required to fix the water flux WF due to the fixed flow rate of the feed solution from the feed solution supply pump 30. Based on this, changes in the pressure of the feed solution from the feed solution supply pump 30 in response to the concentration of the draw solution d are measured using the supply pump pressure gauge 40 and are used as experimental data necessary for subsequent calculation of variables.

The mass of the draw solution d increases continuously due to the water flux WF. The draw solution storage tank 50 and the feed solution storage tank 20 are weighed using a suitable instrument such as a balance to determine whether the flow rate of the feed solution set by the feed solution supply pump 30 is completely consistent with the water flux WF towards the draw solution d.

The feed solution reservoir 11 may include a feed line 11a, a discharge line 11b, and a valve 11c. The feed line 11a is connected to the feed solution supply pump 30 through a line and the feed solution f accommodated in the feed solution reservoir 11 is discharged through the discharge line 11b. The valve 11c opens and closes the discharge line 11b. The valve 11c closes the discharge line 11b when the water flux WF occurs and opens the discharge line 11b when discharge of the feed solution f is needed.

Figure 3:
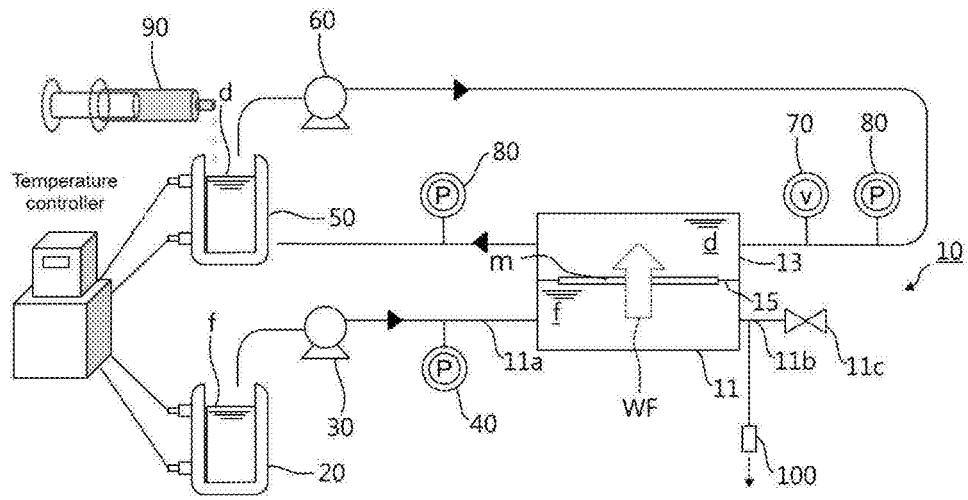
FIG. 3 is a diagram showing the constitution of a system for measuring mass transfer in a membrane and solutions according to another embodiment of the present invention.

FIG. 3 is a diagram showing the constitution of a system for measuring properties of mass transport behavior in a membrane and solutions according to another embodiment of the present invention.

The system shown in FIG. 3 may further include a concentrated draw solution dosing pump 90, in addition to the elements of the system shown in FIG. 1 or 2.

As described above, the concentration of the draw solution d is reduced due to the water flux WF to the draw solution d through the membrane m. When the water flux WF is fixed in a state in which the concentration of the draw solution d is fixed, the reverse salt flux of the membrane can be estimated. The concentrated draw solution dosing pump 90 is used as means to fix the concentration of the draw solution d. The concentrated draw solution dosing pump 90 doses a concentrated draw solution into the draw solution storage tank 50. The concentrated draw solution has a higher concentration than the circulating draw solution d and serves to maintain the draw solution d, whose concentration is reduced by the water flux WF, in a predetermined concentration range. The concentrated draw solution dosing pump 90 fixing the concentration of the circulating draw solution d may be a syringe pump. An agitator (not shown) may be provided in the draw solution storage tank 50 such that the draw solution d in the draw solution storage tank 50 is sufficiently mixed with the concentrated draw solution added.

The system may include a sampling port 100 through which the reverse salt flux is measured. The sampling port 100 is in communication with the interior of the feed solution reservoir 11 such that the feed solution f is sampled from the feed solution reservoir 11. Small amounts of the feed solution f are withdrawn through the sampling port 100 and their concentrations are measured to determine the reverse salt flux. The sampling port 100 is connected to the discharge line 11b of the feed solution reservoir 11, as shown in FIG. 3, but its location is not necessarily limited thereto.

The sampling port 100 is preferably formed such that the feed solution f is withdrawn from the inner central portion of the feed solution reservoir 11, because the concentrations of the feed solution f sampled from the inner central portion of the feed solution reservoir 11 can be measured with higher precision.

The pressure of the feed solution supply pump 30 and a change in the concentration of the draw solution d measured at the fixed water flux WF in the previous embodiments are used to measure desired variables related to mass transfer in the membrane m. The variables are estimated by equations obtained using a solution-diffusion model. The equations are as follows:

$$S = \frac{D}{J_w}\ln\left(\frac{AJ_w\pi_{D,b}\exp\left(-\frac{J_w}{k_D}\right) + BJ_w\exp\left(-\frac{J_w}{k_D}\right) - AB\Delta P\exp\left(-\frac{J_w}{k_D}\right)}{(J_w)^2 + BJ_w - AJ_w\Delta P - AB\Delta P + AJ_w\pi_{F,m}}\right) \quad (1)$$

$$D = \frac{SJ_w}{\ln\left(\frac{AJ_w\pi_{D,b}\exp\left(-\frac{J_w}{k_D}\right) + BJ_w\exp\left(-\frac{J_w}{k_D}\right) - AB\Delta P\exp\left(-\frac{J_w}{k_D}\right)}{(J_w)^2 + BJ_w - AJ_w\Delta P - AB\Delta P + AJ_w\pi_{F,m}}\right)} \quad (2)$$

$$k_D = \frac{J_w}{\ln\left(\frac{AJ_w\pi_{D,b}\exp(-J_wK) + BJ_w\exp(-J_wK) - AB\Delta P\exp(-J_wK)}{(J_w)^2 + BJ_w - AJ_w\Delta P - AB\Delta P + AJ_w\pi_{F,m}}\right)} \quad (3)$$

$$R_{ECP} = \frac{(J_w)^2 + BJ_w - AJ_w\Delta P - AB\Delta P + AJ_w\pi_{F,m}}{AJ_w\pi_{D,b}\exp(-J_wK) + BJ_w\exp(-J_wK) - AB\Delta P\exp(-J_wK)} \quad (4)$$

$$R_{ICP} = \frac{(J_w)^2 + BJ_w - AJ_w\Delta P - AB\Delta P + AJ_w\pi_{F,m}}{AJ_w\pi_{D,b}\exp\left(-\frac{J_w}{k_D}\right) + BJ_w\exp\left(-\frac{J_w}{k_D}\right) - AB\Delta P\exp\left(-\frac{J_w}{k_D}\right)} \quad (5)$$

where S represents the structural parameter of the membrane, D represents the mass diffusion coefficient, $J_w$ represents the water flux, A represents the water permeability of the membrane, $\pi_{D,b}$ represents the osmotic pressure of the draw solution, $k_D$ represents the mass transfer coefficient in the solution, B represents the solute permeability of the membrane, $\Delta P$ represents the pressure of the feed solution supply pump, $\pi_{F,m}$ represents the osmotic pressure of the feed solution on the surface of the membrane ($\pi_{F,m}$ is 0 because the concentration of the feed solution is 0), K represents the mass transfer resistance in the membrane (calculated by S/D), $R_{ECP}$ represents the magnitude of external concentration polarization (calculated by $\exp(-J_w/k_D)$), and $R_{ICP}$ represents the magnitude of internal concentration polarization (calculated by $\exp(-J_w \cdot K)$).

The use of these equations allows simple calculation of the desired variables related to the mass transfer in the membrane from the obtained data and membrane information.

Overall, the use of the system according to the present invention can reduce the uncertainty of measurement by fixing the water flux. The greatest feature of the present invention resides in that the fixed water flux can reduce uncertainty arising from the relationship between the water flux and the surface concentration. According to conventional approaches, the relationship between the water flux and the surface concentration is analyzed using a theoretical model and thereafter the surface concentration and the water flux are indirectly estimated through the concentrations of the draw solution and the feed solution based on the analysis results. In contrast, the system of the present invention can more clearly measure the surface concentration and the water flux than conventional approaches.

The system of the present invention can be used to measure various variables related to mass transfer in the membrane (mass transfer coefficient, membrane structural parameter, mass diffusion coefficient, degrees of external and internal concentration polarization, and reverse salt flux). General-purpose experimental setups and methods for measuring various variables related to mass transfer using a single system have not been developed so far. In contrast, the system of the present invention can be used to comprehensively measure and analyze and economically determine variables related to mass transfer in the membrane.

Furthermore, the system of the present invention can continuously measure a wide range of values through a single experiment. Since the system of the present invention can maintain the fixed water flux over the entire experimental period, it allows the feed pressure to vary despite a change in the concentration of the draw solution and continuously corrects the varying feed pressures such that the water flux is continuously maintained at a constant level. Based on this feature, changes in the variables related to mass transfer in the membrane in response to the concentration of the draw solution can be measured continuously. Particularly, the system of the present invention can save time and cost required for measurement due to its ability to continuously measure mass transfer coefficients and mass diffusion coefficients, which could not be achieved by conventional approaches.

The present invention will be explained in more detail with reference to the following specific experimental examples.

1. Experimental Design and Procedure

The system shown in FIG. 2 having the same construction as that of a general pressure-assisted forward osmosis (PAFO) system was fabricated. DI water was used as a feed solution at the feed side and a solution of a draw solute in DI water was used as a draw solution ($Na_2SO_4$ or $MgSO_4$ solution) at the draw side. In a state in which the outlet of the feed side was closed, the water flux was maintained constant using a HPLC pump (Series III, Scientific Systems Inc., USA). Pressures adjusted by the HPLC pump were continuously recorded using a pressure gauge (SBPG 0007BLG-FC, Sensys, Korea) at the feed side. Noise was removed from the pressure signals using a moving average filter having 15 data points. The draw solution was circulated using a magnetic pump at the draw side and pressure gauges were placed at the inlet and outlet of the membrane module to observe the actual pressure before feeding into the membrane and a drop in the internal pressure of the membrane channel. The flow rate of the circulating draw solution was measured using a flow gauge (AGM-006SI, AUTO-FLOW Corp., Korea). Balances (WTC 2000, RADWAG, Poland) were used at the feed side and draw side to determine whether the flow rate by the operation of the HPLC pump was identical to the actual water flux. The temperatures of the two solutions were maintained constant using thermostatic baths (RW-0525G, JeioTech, Korea).

As shown in FIG. 3, a concentrated draw solution was portionwise fed into the draw solution tank using a syringe pump (PHD 2000, Harvard Apparatus, USA) to maintain the concentration of the draw solution reduced by the water flux constant over the entire experimental period.

In this experiment, $Na_2SO_4$ and $MgSO_4$ solutions, each of which had two different (high and low) concentrations, were used. The water flux was fixed to 1.02 ml/min for the $Na_2SO_4$ solution having a low concentration and 1.12 ml/min for the $Na_2SO_4$ solution having a high concentration. The water flux was fixed to 0.915 ml/min for the $MgSO_4$ solution having a low concentration and the $MgSO_4$ solution having a high concentration.

Variables related to mass transfer in the membrane were estimated using the above equations.

2. Results 2.1. Estimation and Comparison of Structural Parameters and ICP of Membranes FIGS. 4A to 4D show structural parameters (S) and magnitudes of internal concentration polarization ($R_{ICP}$) of membranes measured using the $Na_2SO_4$ draw solutions. FIGS. 5A to 5D show structural parameters (S) and magnitudes of internal concentration polarization ($R_{ICP}$) of membranes measured using $MgSO_4$ draw solutions.

Figure 4A:
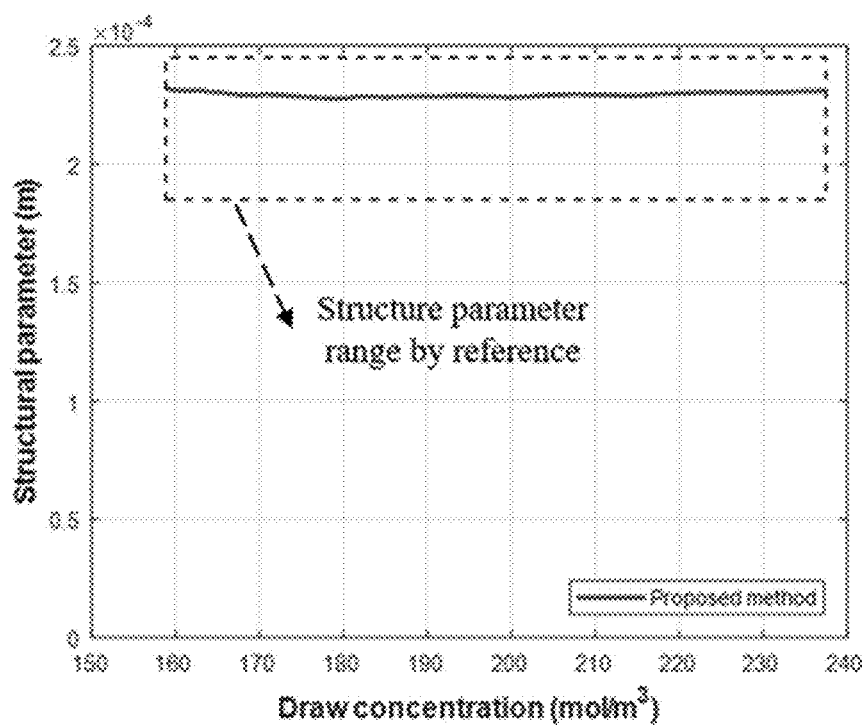
FIGS. 4A to 4D show structural parameters (S) and magnitudes of internal concentration polarization ($R_{ICP}$) of membranes measured in Experimental Example 2.1 where $Na_2SO_4$ draw solutions were used.
Figure 4B:
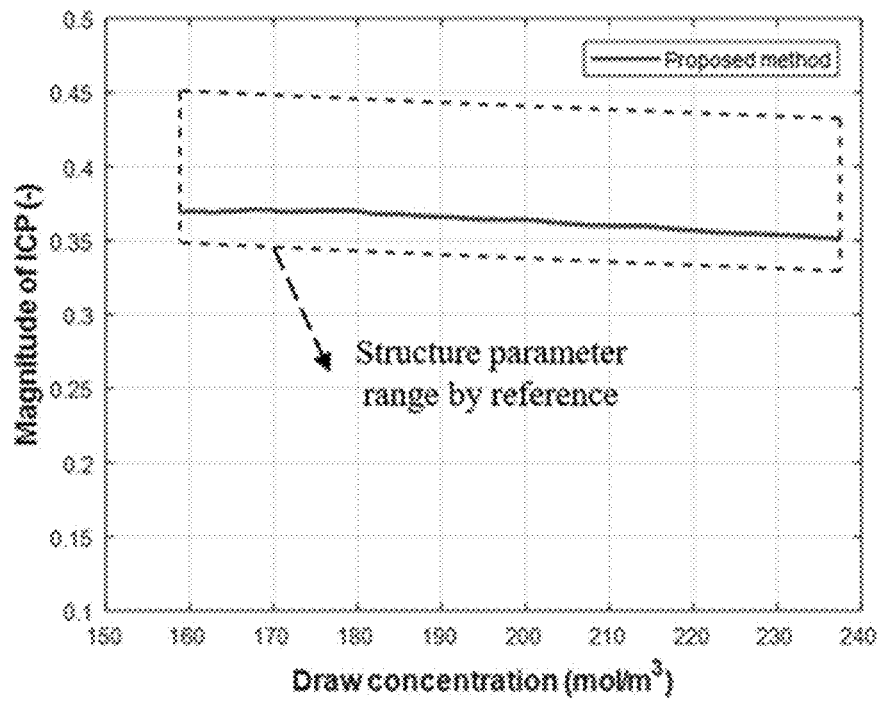
Figure 4C:
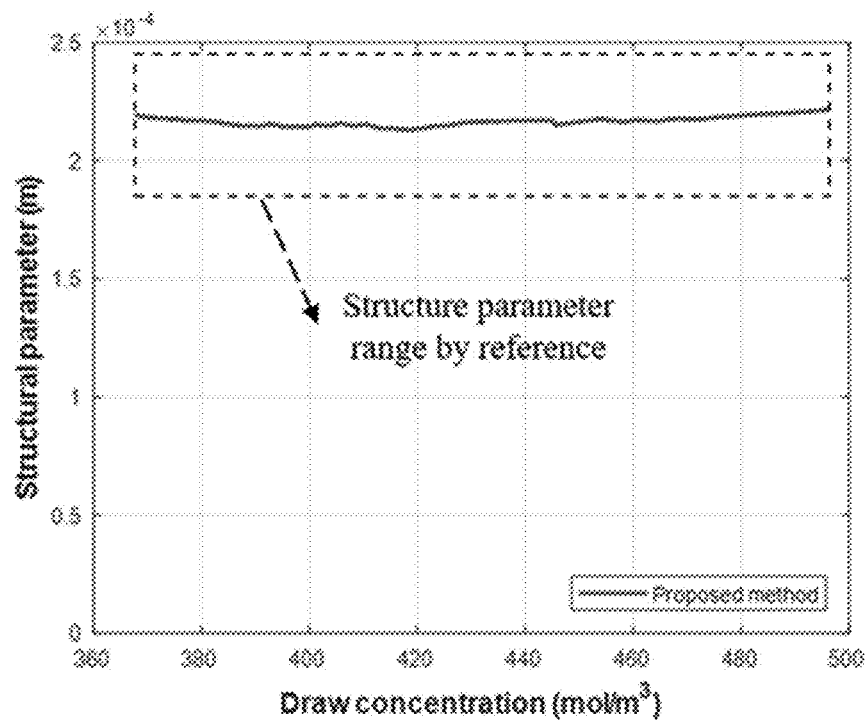
Figure 4D:
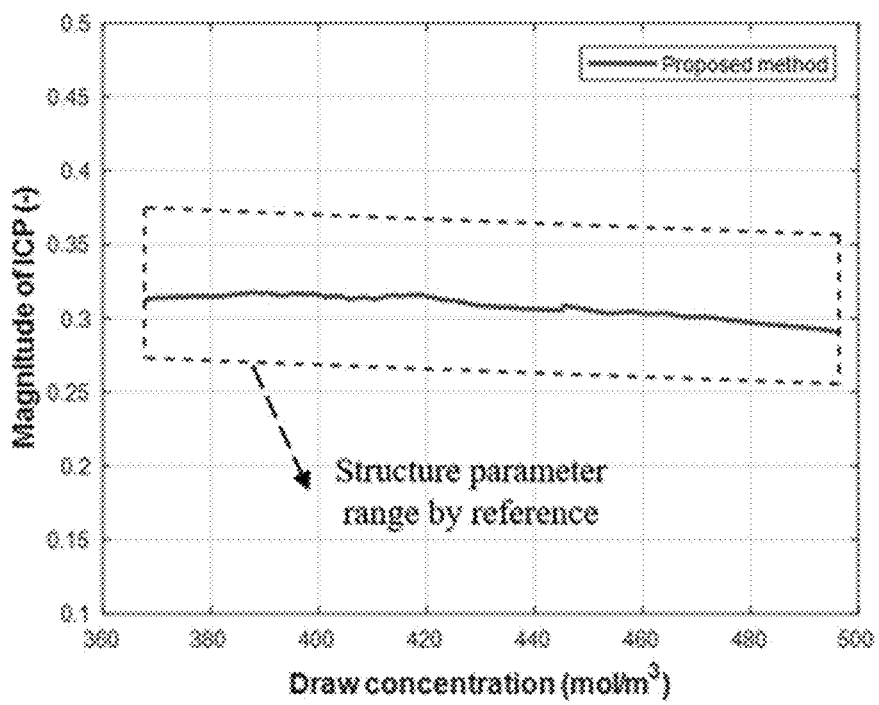
Figure 5A:
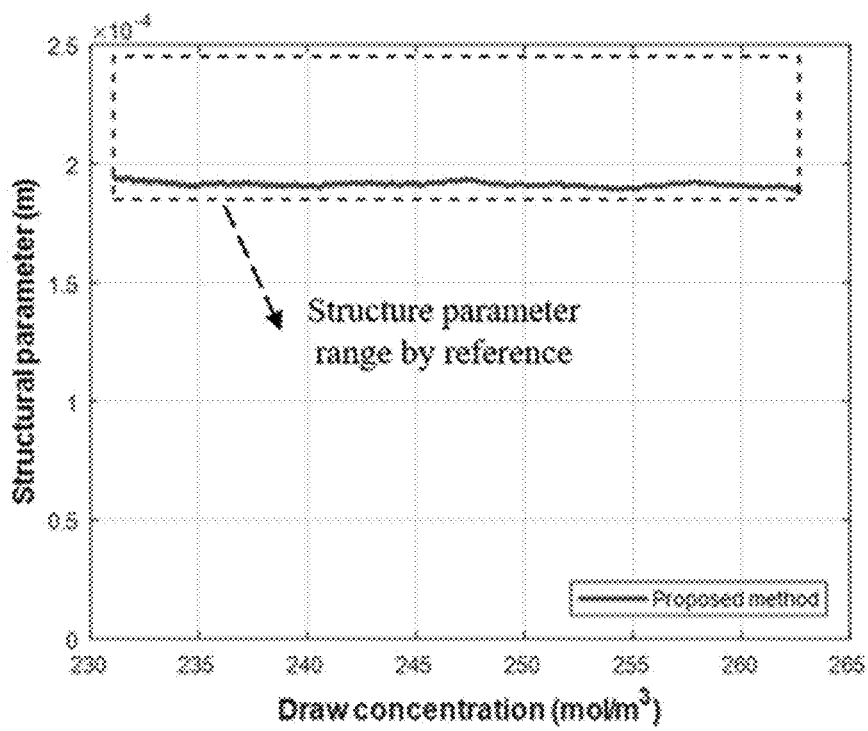
FIGS. 5A to 5D show structural parameters (S) and magnitudes of internal concentration polarization ($R_{ICP}$) of membranes measured in Experimental Example 2.1 where $MgSO_4$ draw solutions were used.
Figure 5B:
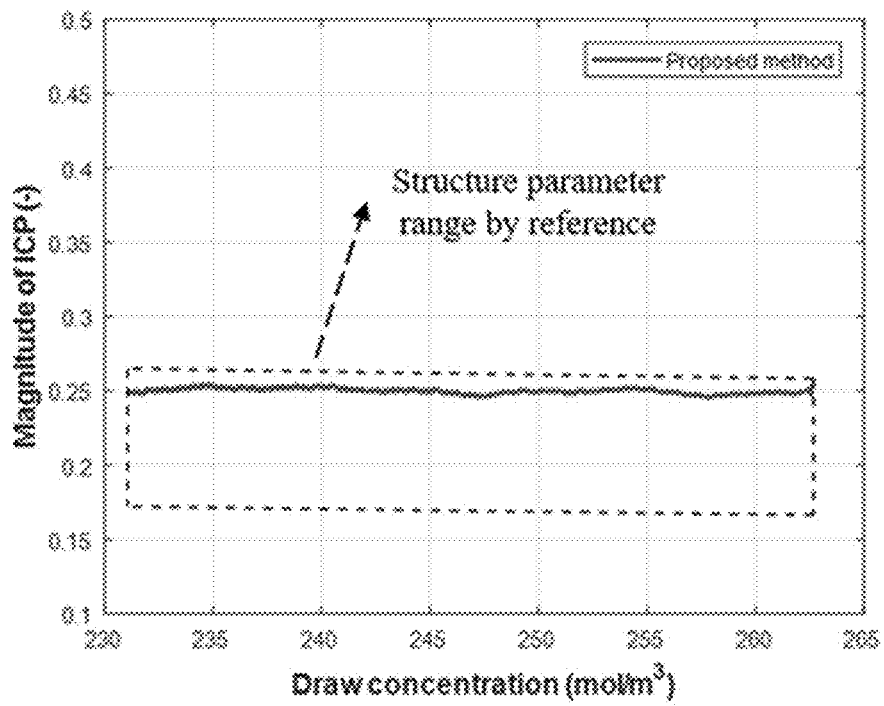
Figure 5C:
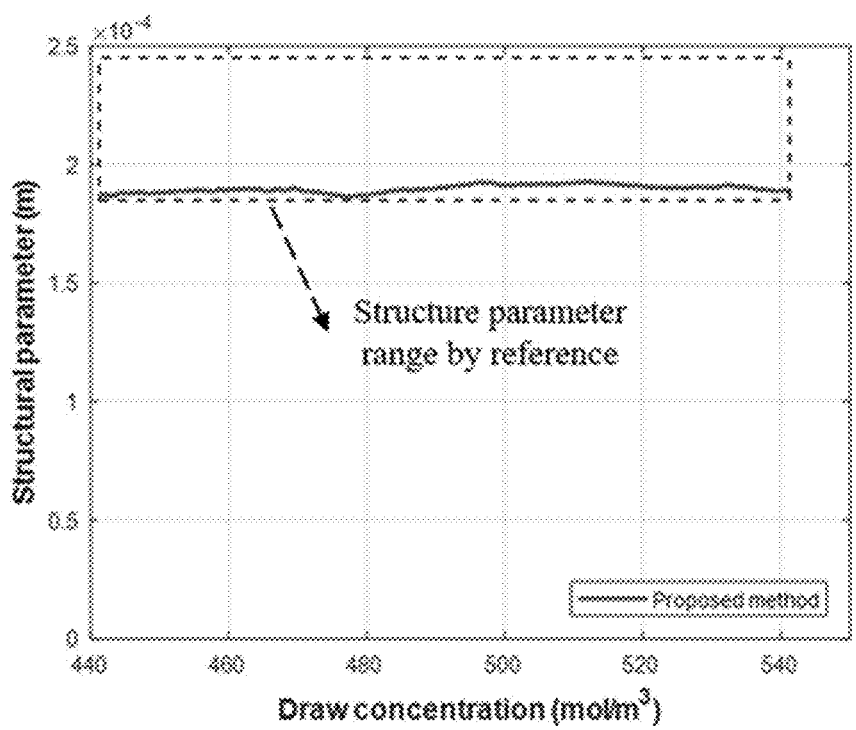
Figure 5D:
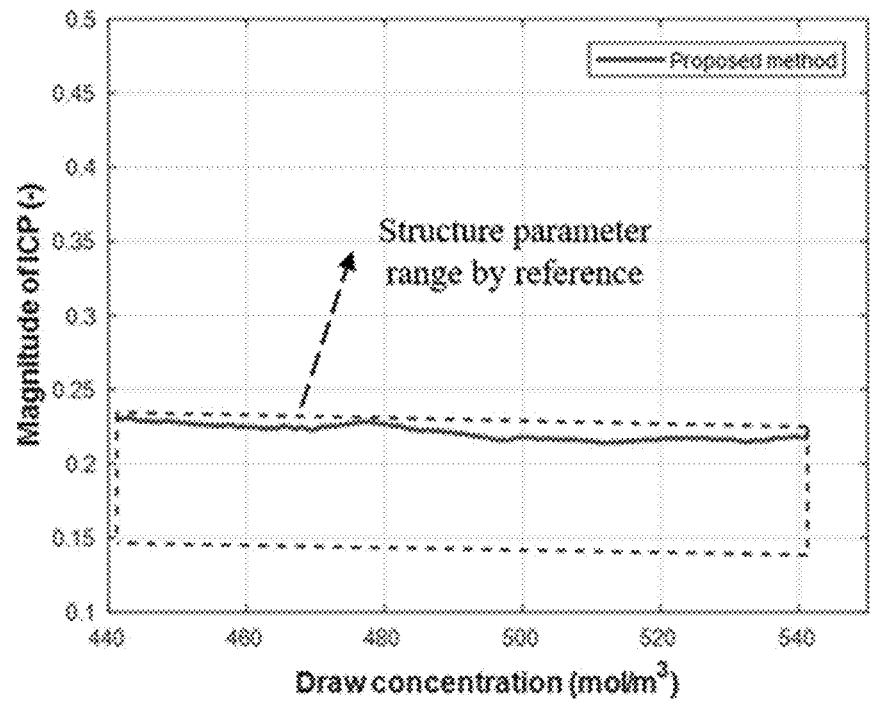

The membrane structural parameters (S) and the magnitudes of internal concentration polarization of the membranes obtained using the inventive system were compared with the specifications of the membranes and the magnitudes of Rap calculated by the conventional approach. The results are shown in FIGS. 4A to 4D and FIGS. 5A to 5D FIG. 4A and FIG. 5A show the structural parameters of the membranes when the $Na_2SO_4$ and $MgSO_4$ draw solutions having low concentrations were used, respectively. FIG. 4B and FIG. 5B show the magnitudes of Rap when the $Na_2SO_4$ and $MgSO_4$ draw solutions having low concentrations were used, respectively. FIG. 4C and FIG. 5C show the structural parameters of the membranes when the $Na_2SO_4$ and $MgSO_4$ draw solutions having high concentrations were used, respectively. FIG. 4D and FIG. 5D show the magnitudes of $R_{ICP}$ when the $Na_2SO_4$ and $MgSO_4$ draw solutions having high concentrations were used, respectively.

Referring to FIGS. 4A to 4D and FIGS. 5A to 5D, the structural parameters of the membranes measured using the draw solutions were in good agreement with the specifications of the membranes provided from the manufacturer. Particularly, the structural parameters of the membranes were measured very accurately at both low and high concentrations irrespective of the type of the draw solution. These results indicate that the structural parameters of the membranes were measured continuously over a broad concentration range.

In addition, the magnitudes of internal concentration polarization estimated by the inventive system matched the values calculated by the conventional approach.

2.2. Estimation and Comparison of Mass Transfer Coefficients and ECP

FIGS. 6A to 6D show mass transfer coefficients ($k_D$) and magnitudes of external concentration polarization ($R_{ECP}$) measured using the $Na_2SO_4$ draw solutions and FIGS. 7A to 7D show mass transfer coefficients ($k_D$) and magnitudes of external concentration polarization ($R_{ECP}$) measured using the $MgSO_4$ draw solutions.

Figure 6A:
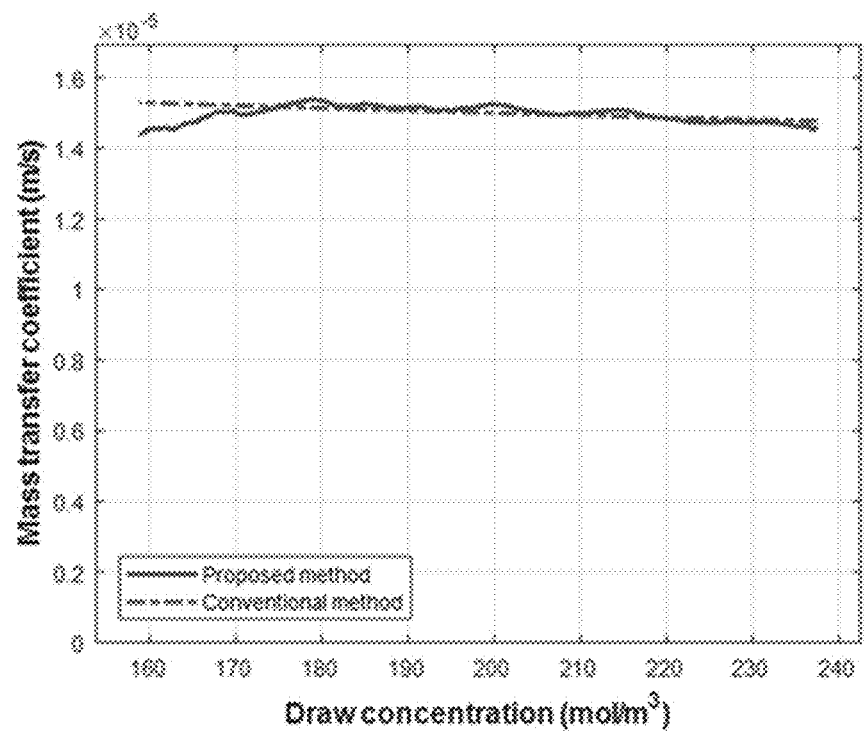
FIGS. 6A to 6D show mass transfer coefficients ($k_d$) and magnitudes of external concentration polarization ($R_{ECP}$) measured in Experimental Example 2.2 where $Na_2SO_4$ draw solutions were used.
Figure 6B:
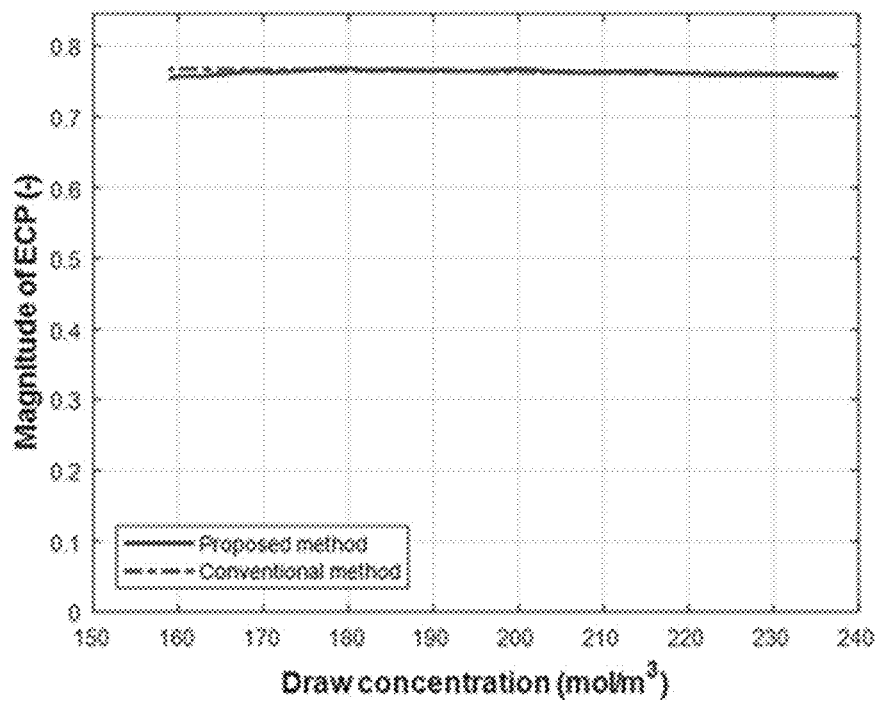
Figure 6C:
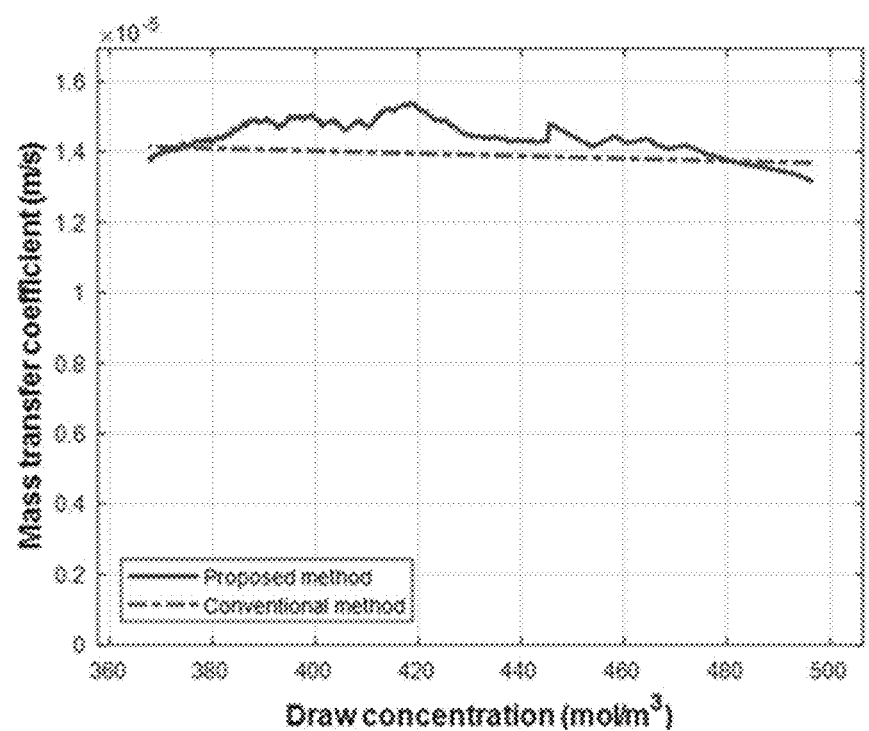
Figure 6D:
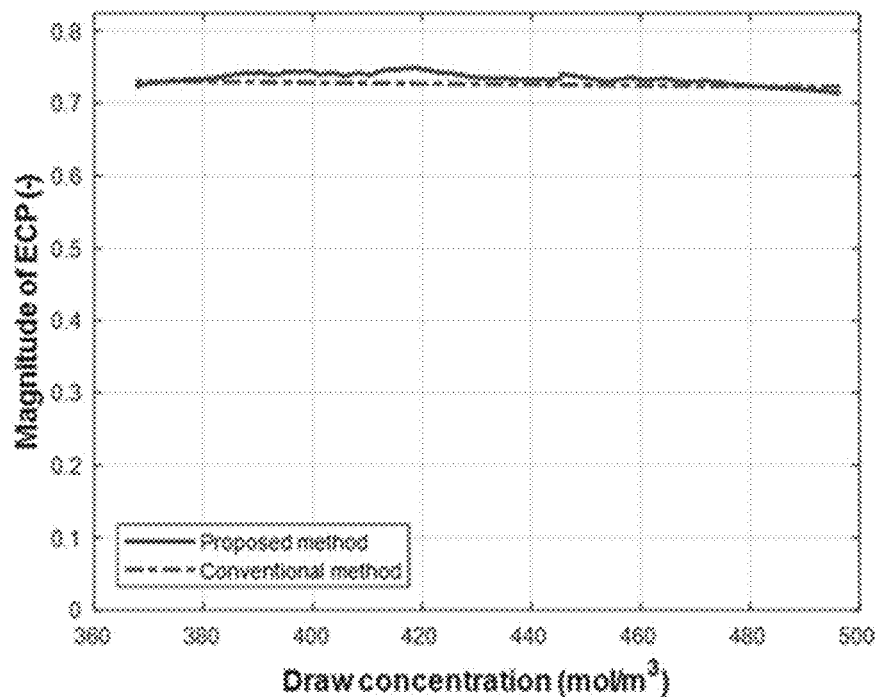
Figure 7A:
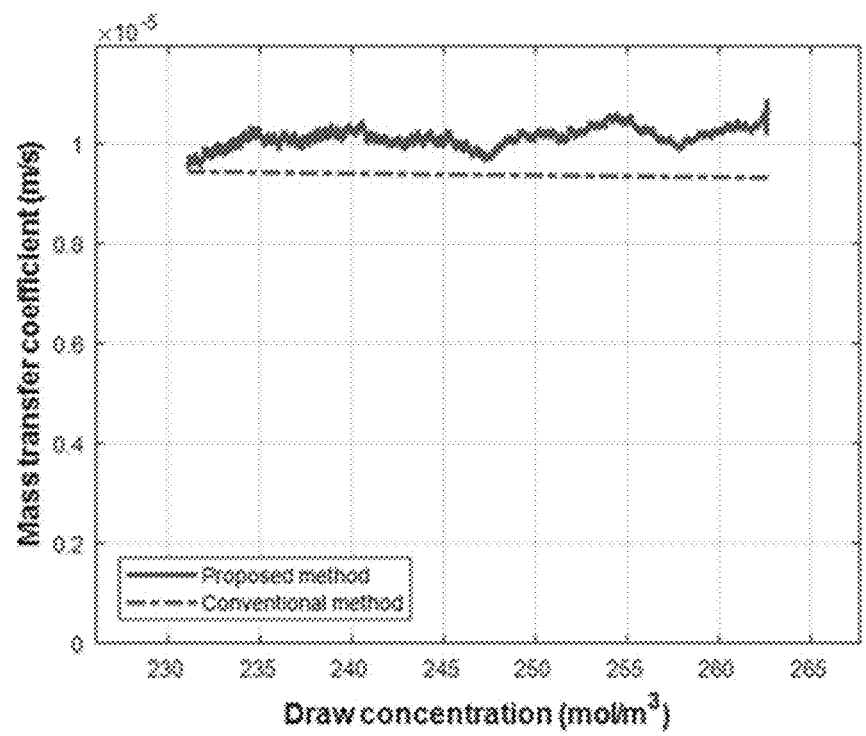
FIGS. 7A to 7D show mass transfer coefficients ($k_d$) and magnitudes of external concentration polarization ($R_{ECP}$) measured in Experimental Example 2.2 where $MgSO_4$ draw solutions were used.
Figure 7B:
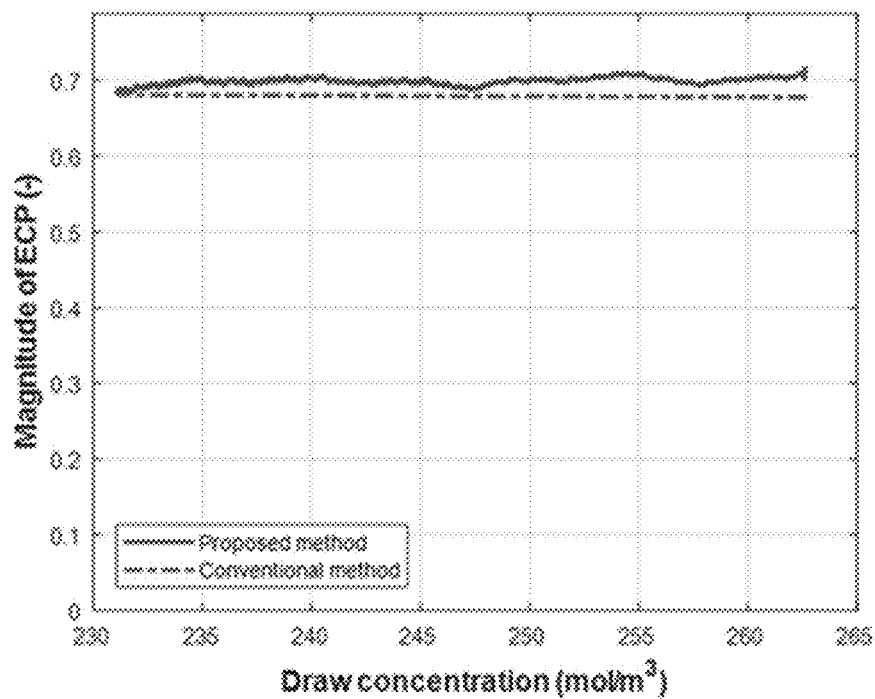
Figure 7C:
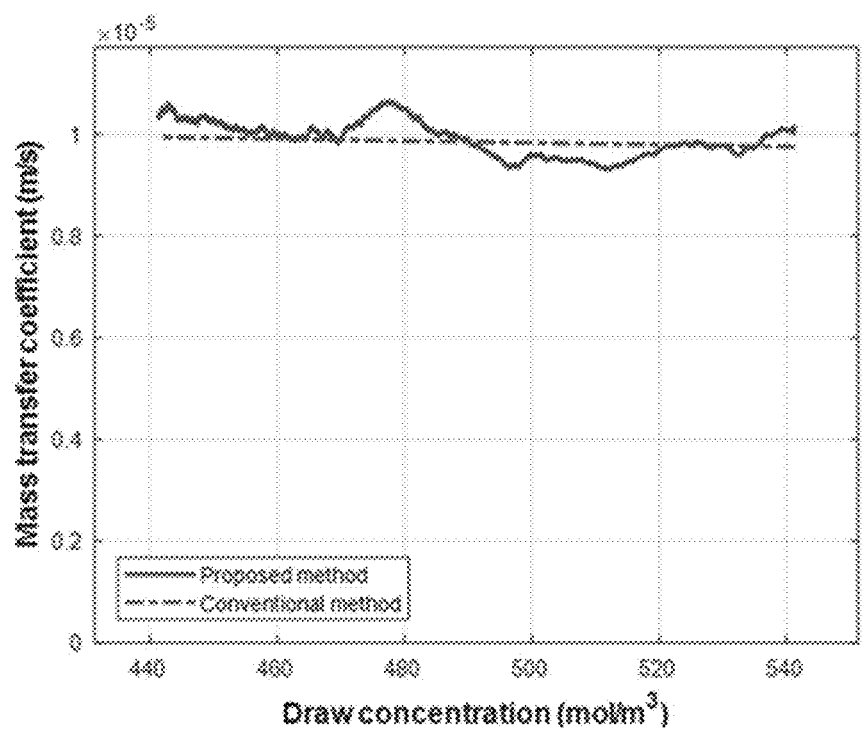
Figure 7D:
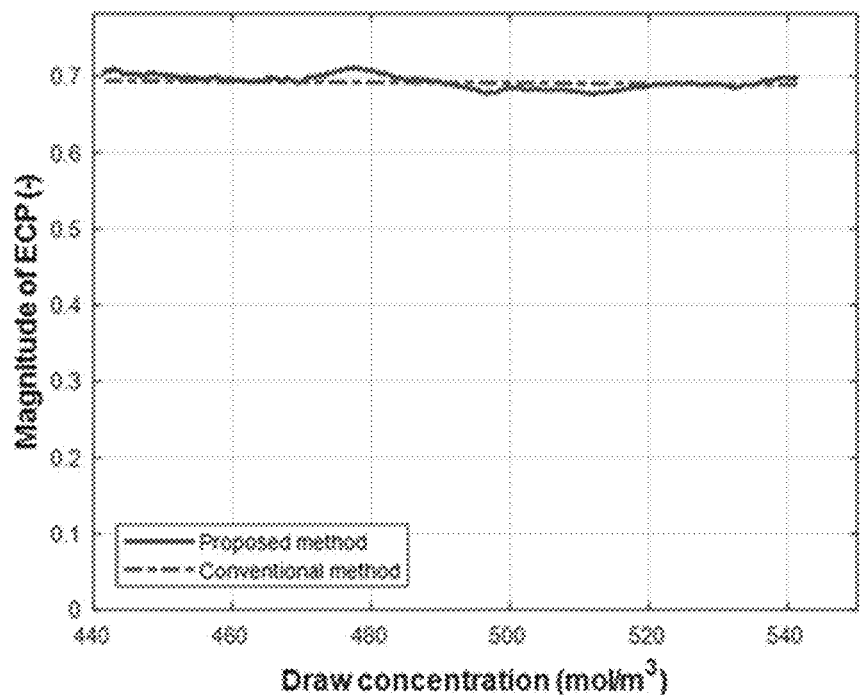

The mass transfer coefficients ($k_D$) and the magnitudes of external concentration polarization ($R_{ECP}$) obtained using the inventive system were compared with the values calculated by the conventional approach. The results are shown in FIGS. 6A to 6D and FIGS. 7A to 7D. FIG. 6A and FIG. 7A show the $k_D$ values when the $Na_2SO_4$ and $MgSO_4$ solutions having low concentrations were used, respectively. FIG. 6B and FIG. 7B show the magnitudes of $R_{ECP}$ when the $Na_2SO_4$ and $MgSO_4$ solutions having low concentrations were used, respectively. FIG. 6C and FIG. 7C show the $k_D$ values when the $Na_2SO_4$ and $MgSO_4$ solutions having high concentrations were used, respectively. FIG. 6D and FIG. 7D show the magnitudes of $R_{ECP}$ when the $Na_2SO_4$ and $MgSO_4$ solutions having high concentrations were used, respectively.

As can be seen from the above results, the mass transfer coefficients and magnitudes of external concentration polarization obtained using the inventive system well matched the values calculated by the conventional approach in a broad range from low to high concentration irrespective of the type of the draw solution. The estimated mass transfer coefficients had an error of less than ±10% compared to the values calculated by the conventional approach and the magnitudes of external concentration polarization had an error of less than 5% compared to the values calculated by the conventional approach. These errors are within the allowable range. In conclusion, the inventive system can measure mass transfer coefficients and magnitudes of external concentration polarization.

2.3. Estimation and Comparison of Mass Diffusion Coefficients

FIGS. 8A to 8D show mass diffusion coefficients (D) measured using $Na_2SO_4$ and $MgSO_4$ draw solutions.

Figure 8A:
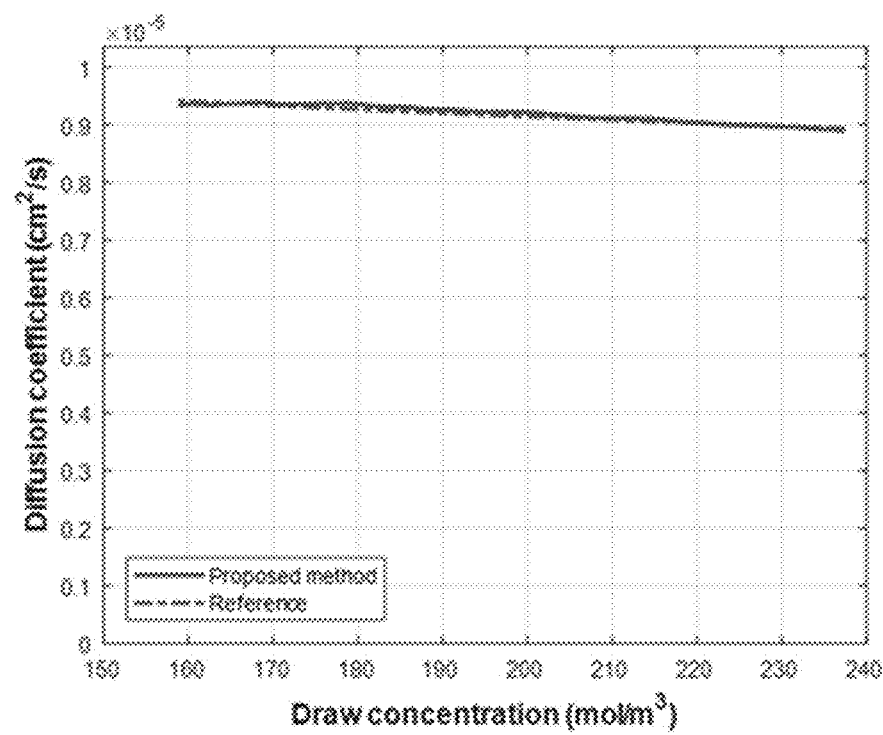
FIGS. 8A to 8D show mass diffusion coefficients (D) measured in Experimental Example 2.3 where $Na_2SO_4$ and $MgSO_4$ draw solutions were used.
Figure 8B:
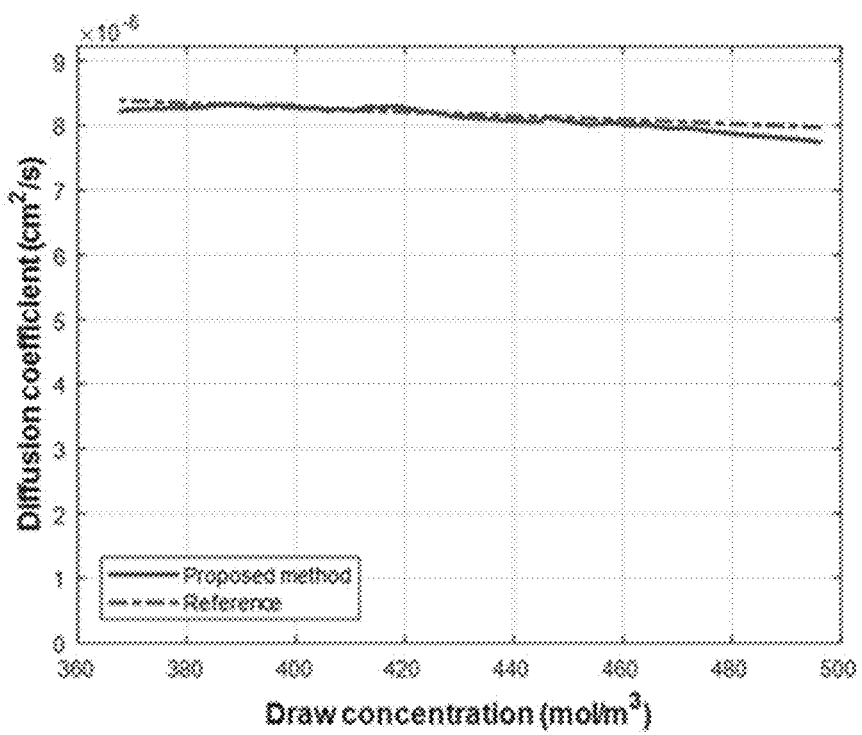
Figure 8C:
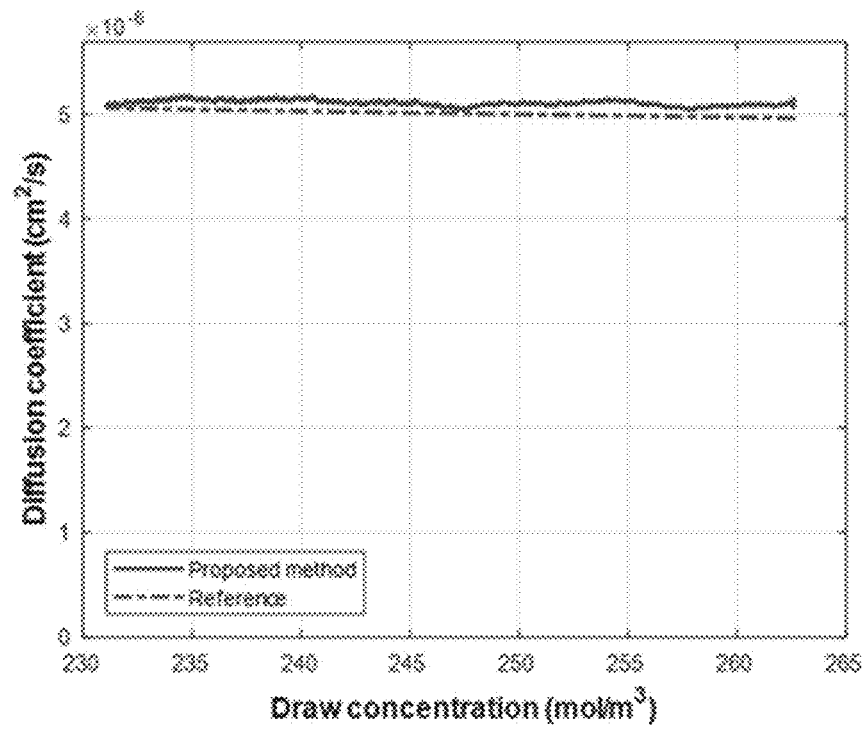
Figure 8D:
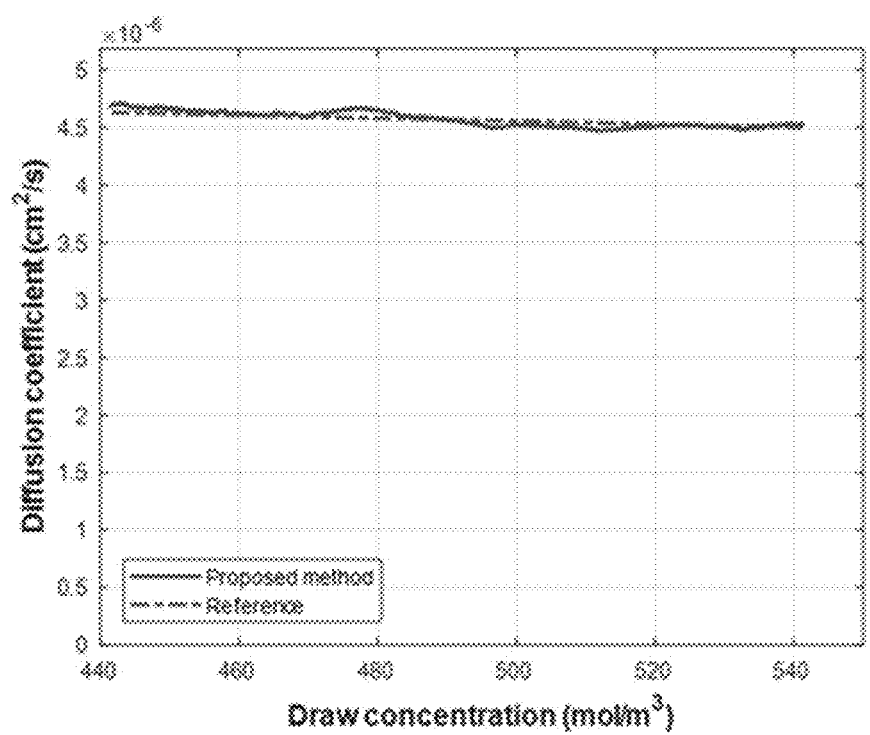

The mass diffusion coefficients (D) obtained using the inventive system were estimated and compared with the literature values. The results are shown in FIG. 8A to 8D. FIG. 8A shows the mass diffusion coefficients (D) when the $Na_2SO_4$ solution having a low concentration was used, FIG. 8B shows the mass diffusion coefficients (D) when the $Na_2SO_4$ solution having a high concentration was used, FIG. 8C shows the mass diffusion coefficients (D) when the $MgSO_4$ solution having a low concentration was used, and FIG. 8D shows the mass diffusion coefficients (D) when the $MgSO_4$ solution having a high concentration was used.

As a result of comparing the mass diffusion coefficients obtained using the inventive system with the literature values, the mass diffusion coefficients obtained using the $Na_2SO_4$ solution and the $MgSO_4$ solution had errors of less than 3.12% and less than 4.60%, respectively. These errors are within the allowable range. In conclusion, the inventive system can measure mass diffusion coefficients.

Although the present invention has been described herein with reference to the specific embodiments, these embodiments do not serve to limit the invention and are set forth for illustrative purposes. It will be apparent to those skilled in the art that modifications and improvements can be made without departing from the spirit and scope of the invention.

Such simple modifications and improvements of the present invention belong to the scope of the present invention, and the specific scope of the present invention will be clearly defined by the appended claims.

What is claimed is:

1. A system for measuring mass transport performance of a semipermeable membrane, comprising:
   a membrane module including a feed solution reservoir accommodating a feed solution, a draw solution reservoir accommodating a draw solution whose osmotic concentration is higher than that of the feed solution, and a holder supporting the semipermeable membrane arranged between the feed solution reservoir and the draw solution reservoir, whose performance is to be measured;
   a feed solution storage tank storing the feed solution;
   a feed solution supply pump supplying the feed solution from the feed solution storage tank to the feed solution reservoir at a fixed flow rate corresponding to a water flux across the membrane such that the water flux is maintained constant; and
   a first balance disposed at the feed solution reservoir and a second balance disposed at the draw solution reservoir to measure the water flux across the membrane.

2. The system according to claim 1, further comprising a supply pump pressure gauge measuring a pressure of the feed solution supply pump for supplying the feed solution.

3. The system according to claim 1, wherein the feed solution supply pump is a high-performance liquid chromatography (HPLC) pump.

4. The system according to claim 1, wherein a temperature of the feed solution and a temperature of the draw solution are maintained in a range of 10 to 40° C.

5. The system according to claim 1, wherein the feed solution reservoir further comprises a feed line through which the feed solution is fed, a discharge line through which the feed solution is discharged, and a valve opening and closing the discharge line.

6. The system according to claim 1, further comprising a concentrated draw solution dosing pump dosing a concentrated draw solution, whose concentration is higher than that of the circulating draw solution, into the draw solution storage tank such that the draw solution, whose concentration is reduced by the water flux, is maintained in a predetermined concentration range.

7. The system according to claim 1, further comprising a sampling port in communication with an interior of the feed solution reservoir such that the feed solution is sampled.

8. The system according to claim 1, further comprising a draw solution storage tank storing the draw solution and a draw solution circulating pump circulating the draw solution such that the draw solution is circulated from the draw solution storage tank through the draw solution reservoir.

9. The system according to claim 8, wherein a flow rate of the circulating draw solution is at least four times the water flux.

10. The system according to claim 8, further comprising a flow gauge measuring the flow rate of the circulating draw solution and a draw solution pressure gauge measuring a pressure of the circulating draw solution.

* * * * *